United States Patent [19]
Gilbert

[11] 3,744,354
[45] July 10, 1973

[54] AUTOMATIC LATHES
[75] Inventor: Harold James Gilbert, Coventry, Warwickshire, England
[73] Assignee: Wickman Machine Tool Sales Limited, Coventry, England
[22] Filed: Jan. 19, 1971
[21] Appl. No.: 107,706

[30]     Foreign Application Priority Data
         Jan. 31, 1970   Great Britain..................... 4,793/70

[52] U.S. Cl................................................. 82/3 R
[51] Int. Cl.............................................. B23b 3/34
[58] Field of Search......................................... 82/3

[56]            References Cited
              UNITED STATES PATENTS
2,701,495    2/1955    Staples................................ 82/3 X 3,283,625    11/1966    Smith..................................... 82/3
2,568,667    4/1950     Staples................................ 82/3 X FOREIGN PATENTS OR APPLICATIONS
742,699      12/1943    Germany............................... 82/3

Primary Examiner—Harrison L. Hinson
Attorney—Holman & Stern

[57]            ABSTRACT

A multi-spindle automatic lathe having drive mechanisms for work spindles, the drive mechanisms incorporating at least one hydraulically actuated clutch whereby drive can be engaged and disengaged when required the drum on which the spindles are mounted having means whereby the clutches can be actuated.

7 Claims, 3 Drawing Figures

Patented July 10, 1973  3,744,354

3 Sheets-Sheet 1

INVENTOR
Harold James Gilbert
Holman & Stern
ATTORNEYS

AUTOMATIC LATHES

This invention relates to automatic multi-spindle lathes and is concerned with the drive mechanisms for the work spindles.

In such machines it has been the practice for the drive mechanism for each of the work spindles to include a clutch which can be engaged and disengaged during appropriate parts of the machine cycle to drive or arrest the spindle as required.

Mechanical clutches have been used, but besides requiring complex operating means, have certain shortcomings in respect of the accuracy of control which can be achieved. Electrical clutches have also been proposed, but clutches of this kind and having the power required, tend to be rather large and cannot easily be accommodated within the drum in which the work spindles of the machine are provided.

The object of this invention is to provide a multi-spindle automatic lathe containing a particularly convenient and effective form of work spindle drive mechanism.

According to the present invention there is provided a multi-spindle automatic lathe having drive mechanisms for the work spindles respectively, the drive mechanisms incorporating at least one hydraulically actuated clutch respectively.

Figure 1:
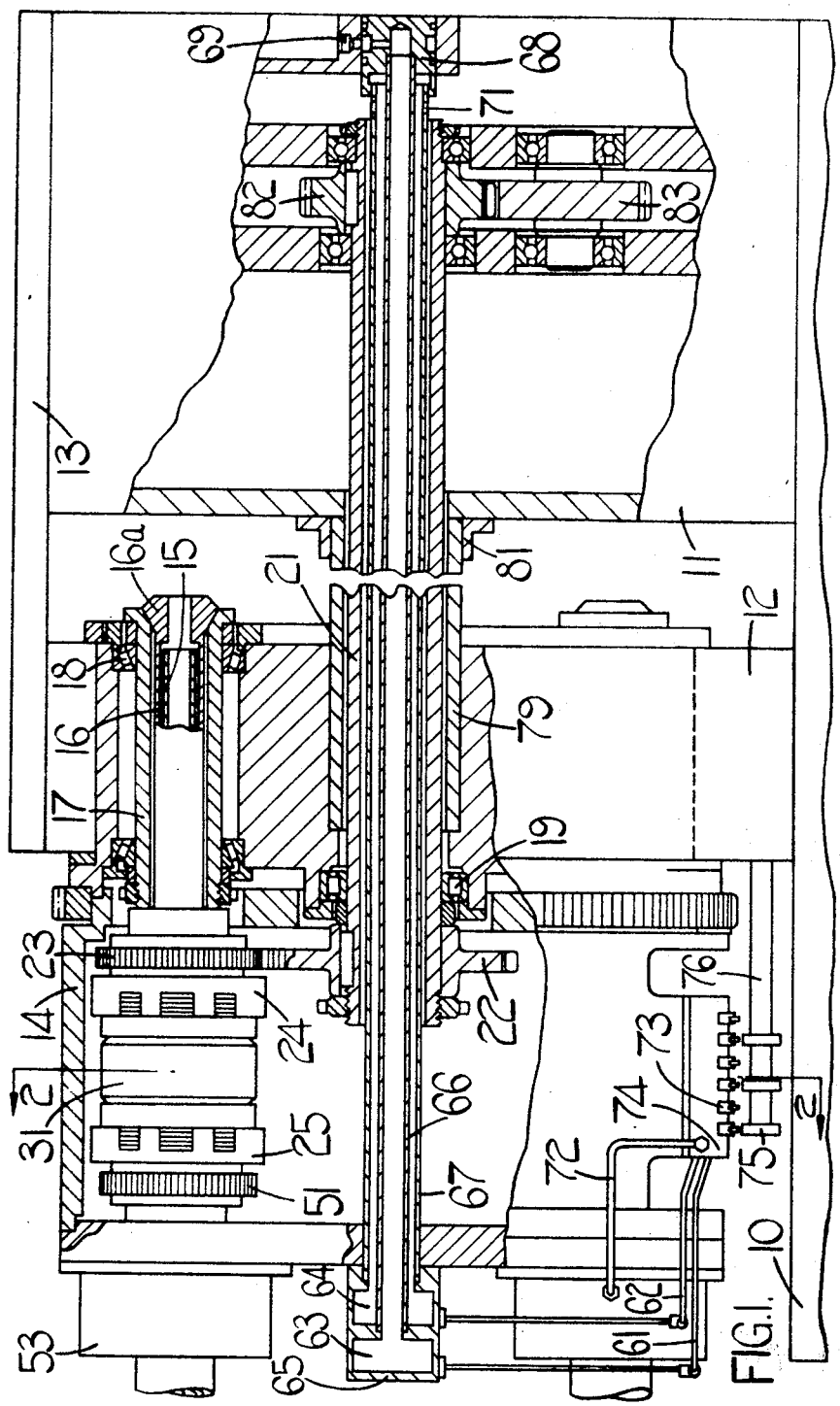
Figure 2:
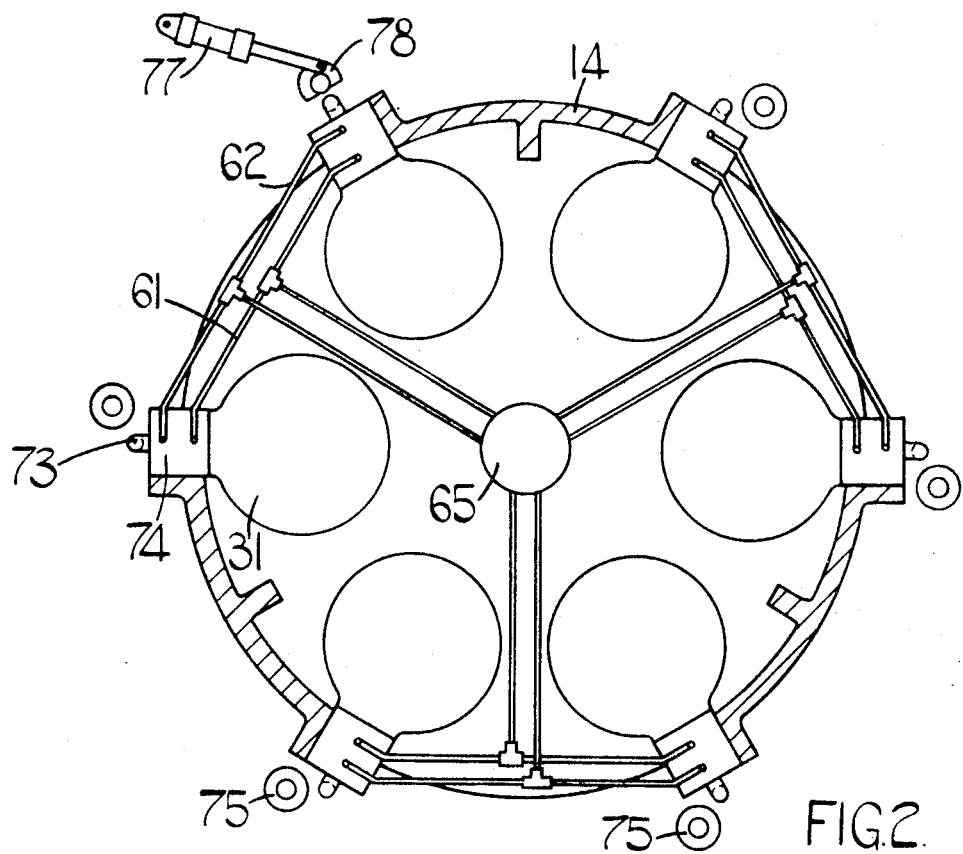
Figure 3:
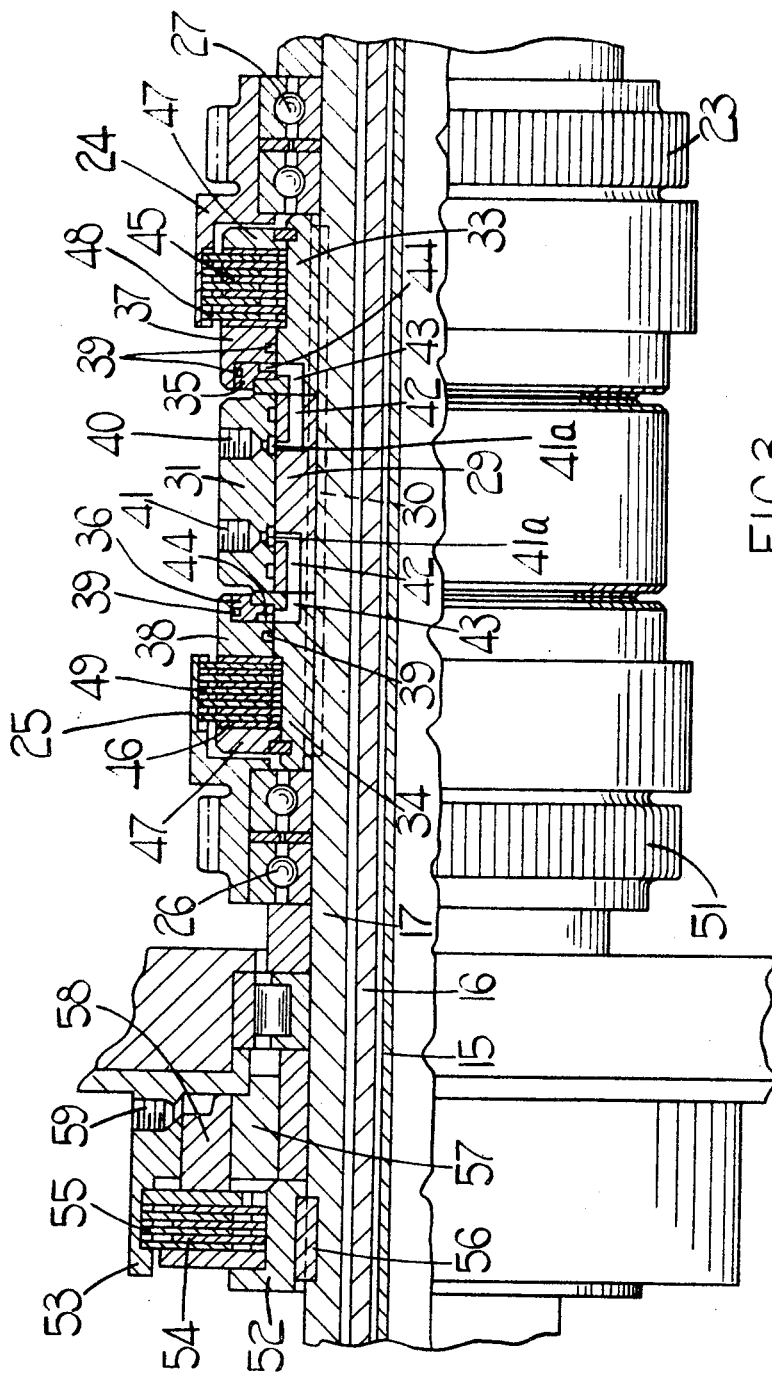

The invention will now be described by way of example with reference to the accompanying drawings in which:

FIG. 1 is a simplified cross-sectional view of a lathe incorporating the invention, FIG. 2 is a view on the line 2—2 in FIG. 1 in which some of the detail has been omitted for clarity, and FIG. 3 is an enlarged cross-sectional view of parts of the clutch mechanism associated with one of the spindles.

The lathe of which an appropriate portion is illustrated is a multi-spindle automatic lathe comprising a base 10 on which are mounted two spaced superstructures 11 and 12. A bridging structure 13 connects the superstructures 11 and 12.

The superstructure 11 contains drive mechanism ( to be described) and the superstructure 12 has rotatably mounted in it a drum 14 with an extension in which are mounted, in this example, six spindles which are equi-angularly spaced about the central axis of the drum. Two or more slides together with their associated mechanisms are provided on the machine, but these have been omitted from the drawings for clarity.

The six spindles 17 each comprise a feed tube 15 enclosed within a collet tube 16 terminating in chuck jaws 16a. Each spindle 17 is hollow and is journalled by means of bearings 18 in the drum 14. The feed tube 15 can accommodate bar stock material which can be advanced through the chuck jaws and can be gripped therein to allow one or more machining operations to be carried out.

Journalled on bearings 19, within the drum 14, is a tubular drive shaft 21. The drive shaft 21 is located within a sleeve 79 which is secured at one end to the drum 14. The other end is supported in a bearing 81 fixed to superstructure 11. The drive shaft 21 carries, at its end remote from the drum 14, a gear wheel 82 which is in mesh with a pinion 83, which in turn is driven through appropriate gearing from a power source (not illustrated) in the superstructure 11. At its end within the drum 14, the tubular drive shaft 21 carries a gear wheel 22 which meshes with six pinions associated with the spindles 17 respectively. One such pinion 23 on one part 24 of a clutch mechanism associated with one of the spindles 17, is shown in FIG. 1, the part 24 is mounted on the spindle 17 by means of bearings 27. Another similar part 25 is also mounted on the spindle 17 through bearings 26.

Keyed to the spindle 17 is a sleeve 29. The key is identified at 30. There is also provided a member 31 which is concentric with and surrounds the sleeve 29. Sleeve 29 is keyed to the spindle 17 and thus rotates in member 31. The key 30 also secures a pair of clutch rings 33, 34 to the spindle 17, one on either side of the sleeve 29. On each clutch ring 33, 34 is mounted a ring 35, 36. The clutch ring 33 and the ring 35 have axially slidably mounted on them an annular piston 37. On the clutch ring 34 and ring 36 is a similar piston 38 shown in FIG. 3. Each piston 37 and 38 is sealed against the concentric cylindrical surfaces of the clutch rings 33, 34 and the rings 35 and 36 by seals 39.

The member 31 has two inlet passages 40, 41 which afford communication through annular grooves 41a and passages 42 in the ring 29 and further passages 43 in the clutch rings 33 and 34 respectively, with spaces, which are identified in FIG. 3 as 44. Entry of fluid under pressure causes the piston 38 to move to the left as seen in FIGS. 1 and 3. The other piston 37 can be moved independantly in similar manner by application of pressure through the other set of passages. The external surface of each of the clutch rings 33, 34 is splined to engage internal formations on a respective set of clutch plates 45, 46. An end plate 47, shown in FIG. 3, serves as a thrust plate for these. Interleaved between these plates 45, 46 are respective further sets of clutch plates 48, 49, one set engaged in the part 24 and the other set engaged in the equivalent part 25. The part 25 has formed on it a pinion 51 which meshes with a train of gears on a layshaft (not shown) driven from the gear 23 on the drive shaft 21. This train of gears, however, provides a speed ratio between the central drive shaft 21 and the individual spindles 17 which differs from that afforded by the meshing of the gear wheel 22 with the pinion 23. The clutch mechanism operated by the piston 38 is only engaged when the clutch mechanism having the piston 37 is disengaged and vice versa.

Each spindle 17 has an associated hydraulically operated brake mechanism which comprises inner and outer parts 52, 53 to which are connected respective sets of clutch plates 54, 55. The inner part 52 is keyed to the spindle 17 by a key 56 and the outer part 53 is non-rotatably secured to the end plate of the drum 14. The part 53, together with a ring 57, defines a chamber containing an annular piston 58 which can act against the clutch plates 54, 55 to engage the brake when fluid is admitted through a passage 59.

The admission of fluid to the inlet passages 40, 41 and 59 is achieved through pipes shown in FIGS. 1 and 2. Fluid is supplied through pipes 61 to the clutches and brake and is exhausted through pipes 62. Sets of branch pipes 61 and 62 supplying the respective work spindles are shown in FIG. 2.

The branch pipes are connected to respective chambers 63, 64 in coupling member 65 which is secured to the end plate of the drum 14.

The coupling member 65 affords communication between the two chambers 63, 64 and two concentric passages defined by two pipes 66 67, which are concentric and extend through the interior of the drive shaft 21 to a rotary joint member 68 within the superstructure 11 of the machine. A supply passage 69 is provided in the housing and exhaust occurs through ports 71 in the wall of the outer pipe 67 adjacent to the rotary joint member 68.

The brakes on each work spindle are supplied through further pipes 72 shown in FIG. 1.

To control the operation of the clutches and brakes there are respective sets of plungers 73, disposed on valve blocks 74 secured to the member 31 on each of the spindles 17 respectively. The valve blocks 74 also serve to contain the connections between the pipes 61 and 62 and the inlet passages 40 and 41 for admitting fluid to the clutch mechanisms and exhausting fluid from them.

The plungers 73 are operable by sets of cams 75 carried on arms 76 on the superstructure 12. As the drum 14 is indexed between one angular position or station and the next, the plungers 73 are engaged by the cams 75 to actuate valves (not illustrated) in the valve blocks 74 to control admission or escape of fluid to the clutch mechanisms.

The cams 75 can be arranged to engage the appropriate plungers 73 upon arrival of the drum at a new station or alternatively before such position is reached. In the latter case, the actuation of a plunger opens the valve and this remains open until a further movement of the drum takes place.

An alternative arrangement for operating the plungers 73 is also shown in FIG. 2. This comprises a fluid operated piston and cylinder unit 77 which is connected to a rotatable cam 78. Actuation of the unit 77 rotates the cam 78 to engage or disengage the plunger 73. By means of this arrangement, a change in the operation of a particular spindle 17 can be achieved shilst the drum is stationary.

The mechanisms described are capable of controlling the actuation of the spindles of the machine individually in any one of a plurality of ways, and the clutch mechanism, though versatile, occupy minimum space within the drum 14.

The means for the supply and exhaust of fluid through the interior of shaft 21 may be replaced by pipes from a pump secured to the base 10 adjacent to the drum 14.

In the example shown there are two clutches and one brake but in another example, one clutch and one brake or two clutches and no brake or more than two clutches may be used.

Having thus described my invention what I claim as new and desire to secure by Letters Patent is:

1. An automatic lathe having a plurality of hollow work spindles, drive mechanisms for the work spindles respectively, the drive mechanisms incorporating respective hydraulically actuated clutches surrounding the spindles respectively.

2. A multi-spindle automatic lathe as claimed in Claim 1 in which the work spindle drive mechanisms are all connected through gearing to a drive shaft located centrally with respect to the work spindles which are equi-angularly arranged in a circle.

3. A multi-spindle automatic lathe as claimed in claim 1 in which each work spindle has a drive mechanism comprising an annular input member adapted for engagement with an annular driving member, a member non-rotatably connected to the work spindle and clutch plates connected to the input member and to the member connected to the work spindle respectively, the last mentioned member having an entry passage for fluid under pressure, and defining a cavity containing an annular piston, entry of fluid through the passage and into the cavity under pressure causing the piston to move to cause the clutch plates to become drivingly engaged.

4. A multi-spindle automatic lathe as claimed in claim 1 in which the drive mechanism of each work spindle has a pair of hydraulically operated clutches, one of the clutches being arranged to be driven through one set of gearing providing a different speed ratio from the first set.

5. A multi-spindle automatic lathe as claimed in claim 1 in which each work spindle has an associated hydraulically operated brake.

6. A mutli-spindle automatic lathe as claimed in claim 1 in which the work spindles are mounted in a drum which is rotatably mounted on the lathe, the drum carrying switch elements arranged to actuate the hydraulically actuated clutches respectively, the switch elements co-operating with further elements on a part of the lathe which is stationary relatively to the drum.

7. A multi-spindle automatic lathe as claimed in claim 2 in which the drive shaft is hollow and through it extend hydraulic supply pipes for supplying fluid to the hydraulically operable clutches.

* * * * *